(12) United States Patent
Salehi-Bakhtiari

(10) Patent No.: US 10,760,720 B2
(45) Date of Patent: Sep. 1, 2020

(54) PRESS FITTING AND JOINT ASSEMBLY WITH SUCH A PRESS FITTING

(71) Applicant: APEX Gold International Limited, Wanchai (HK)

(72) Inventor: Manouchehr Salehi-Bakhtiari, Cordova (ES)

(73) Assignee: APEX Gold International Limited, Wanchai (HK)

( * ) Notice: Subject to any disclaimer, the term of this patent is extended or adjusted under 35 U.S.C. 154(b) by 534 days.

(21) Appl. No.: 15/399,973

(22) Filed: Jan. 6, 2017

(65) Prior Publication Data

US 2017/0122469 A1    May 4, 2017

Related U.S. Application Data

(63) Continuation-in-part of application No. 14/037,330, filed on Sep. 25, 2013, now Pat. No. 9,903,516.

(30) Foreign Application Priority Data

Jul. 10, 2012 (WO) .................. PCT/EP2012/063516

(51) Int. Cl.
*F16L 21/03* (2006.01)
*F16L 37/091* (2006.01)
*F16L 13/14* (2006.01)

(52) U.S. Cl.
CPC .............. *F16L 21/03* (2013.01); *F16L 13/142* (2013.01); *F16L 37/091* (2013.01)

(58) Field of Classification Search
CPC .............................. F16L 13/142; F16L 39/091
USPC ........ 285/104, 105, 321, 340, 345, 374, 382
See application file for complete search history.

(56) References Cited

U.S. PATENT DOCUMENTS

| | | | |
|---|---|---|---|
| 2005/0248152 A1* | 11/2005 | Viegener | F16L 13/142 |
| 2008/0309081 A1* | 12/2008 | De Wilde | F16L 37/091 285/340 |
| 2011/0309611 A1* | 12/2011 | Smith | F16L 37/091 |

* cited by examiner

*Primary Examiner* — Zachary T Dragicevich
(74) *Attorney, Agent, or Firm* — Jones Day

(57) ABSTRACT

A press fitting includes a socket defining at one end an opening for insertion of an end of a tube, a sealing ring within the socket, and a gripping ring within the socket, arranged in front of the sealing ring in the direction of insertion of the tube, wherein the gripping ring is provided with at least one weakening feature, in particular in the form of notches, being reducible in size by deforming the gripping ring when applying a pressing action on the socket such that an inner diameter D2 of the gripping ring is reduced. A joint assembly may comprise such a press fitting having a tube inserted therein.

9 Claims, 12 Drawing Sheets

SECTION A-A

205 →

205 →

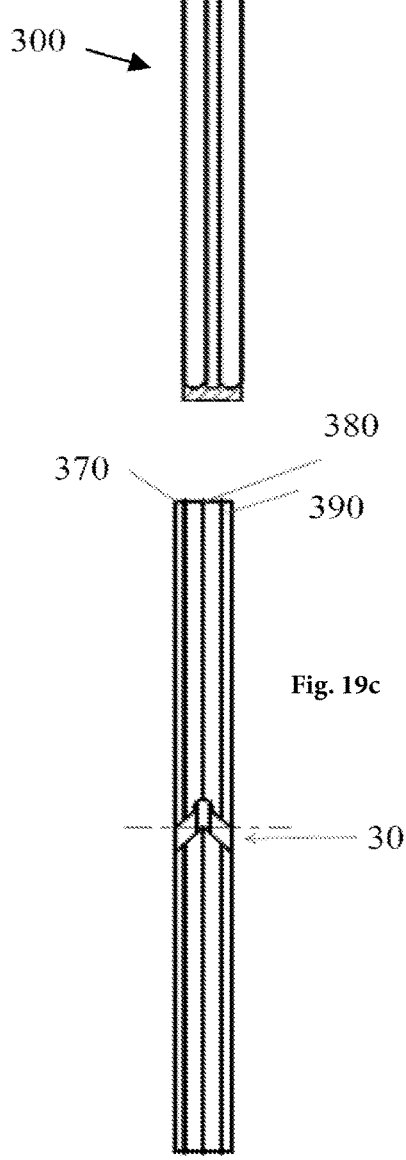
Fig. 19a
Fig. 19c
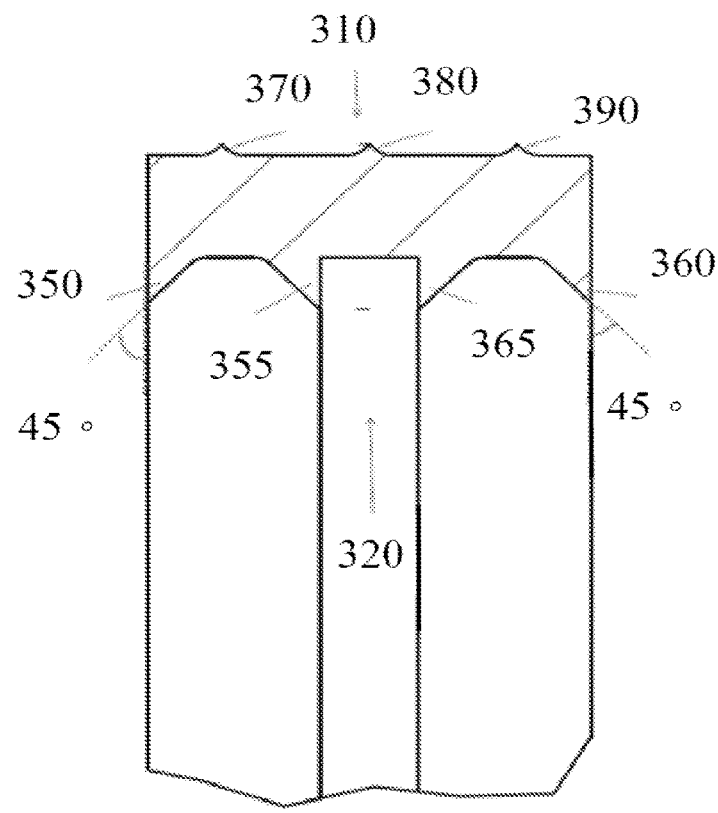
Fig. 19b

PRESS FITTING AND JOINT ASSEMBLY WITH SUCH A PRESS FITTING

CROSS-REFERENCE TO RELATED APPLICATIONS

This application is a continuation-in-part of U.S. patent application Ser. No. 14/037,330, filed Sep. 25, 2013, now Patent No. 9,903,516, which claims the benefit of priority to International Patent Application No. PCT/EP2012/063516, filed Jul. 10, 2012, all of which are incorporated herein by reference in their entirety for all purposes.

STATEMENT REGARDING FEDERALLY SPONSORED RESEARCH OR DEVELOPMENT

Not applicable.

REFERENCE TO A COMPACT DISK APPENDIX

Not applicable.

BACKGROUND OF THE INVENTION

1. Field of the Invention

The present disclosure pertains to a press fitting and a joint assembly with a press fitting.

2. Related Art

EP 1756 462 B1 discloses a pipe fitting for use in coupling metallic pipes and comprising a housing having therein a grip-ring, pipe support means downstream of the grip ring in the direction of pipe insertion, sealing means downstream of the pipe support means, and means limiting movement of the sealing means in said pipe insertion direction, with the pipe support means as well as the limiting means being formed integrally with the housing. This leads to a complicated housing shape.

A press fitting is known from EP 1 593 899 B 1 with a socket housing in addition to a gripping ring and a sealing ring, a spacer, or separating ring. The drawback of the known press fitting is the necessity of a spacer.

SUMMARY

In an aspect, a press fitting, includes a socket defining at one end an opening for the insertion of an end of a tube, a sealing ring within the socket, and a gripping ring within the socket, arranged in front of the sealing ring in the direction of insertion of the tube, wherein the gripping ring is provided with an opening being reducible in size by deforming the gripping ring when applying a pressing action on the socket such that the inner diameter of the gripping ring is reduced, and the inner diameter of the gripping ring is chosen to be larger than the outer diameter of the tube prior to reducing the size of the opening when applying a pressing action, and the opening has a curved vertex.

The gripping ring may have two end surfaces which are extending perpendicularly to the longitudinal axis of the gripping ring, and the opening may be extending from the one end surface to the other end surface with a v shape.

The gripping ring may have an upper surface and a lower surface, and the upper surface have one or more gripping ring teeth or projections and the lower surface has one or more gripping ring teeth or projections.

The gripping ring may have an upper surface and a lower surface, and the upper surface may have three gripping ring teeth or projections and the lower surface may have two gripping ring teeth or projections.

The three upper teeth or projections may be formed at a center of the gripping ring, and the two lower teeth or projections may be formed at an edge of the gripping ring.

The gripping ring may have an upper surface and a lower surface, and the upper surface may have three gripping ring teeth or projections and the lower surface may have three gripping ring teeth or projections.

The three upper teeth or projections may be formed at a center of the gripping ring, and the three lower teeth or projections may be formed with two at an edge of the gripping ring and one at a middle of the gripping ring.

The gripping ring may have an upper surface and a lower surface, and the upper surface may have three gripping ring teeth or projections and the lower surface may have four gripping ring teeth or projections.

The three upper teeth or projections may be formed at a center of the gripping ring, and the four lower teeth or projections may be formed with two at an edge of the gripping ring and two at a middle of the gripping ring.

The opening may extend substantially axially.

The gripping ring may have one or more teeth or projections and the teeth or projections of the gripping ring form a 45 degree or a 90 degree angle.

The gripping ring have one or more teeth or projections and the teeth or projections are evenly separated.

The v-shaped opening may form an angle that is substantially 45 degrees with respect to a horizontal axis perpendicular to the longitudinal axis of the gripping ring.

The gripping ring may be arranged within a recess of the socket together with the sealing ring or within a recess of the socket separate from the recess of the socket for the sealing ring or within a broadened mouth of the socket separate from the recess of the sealing ring.

The gripping ring and the sealing ring may be arranged next to each other within the same recess, having a substantially rectangular cross section, with the face of the gripping ring facing towards the sealing ring forming a sealing ring abutment with an abutment angle relative to the inner surface of the socket within the recess of 90 degrees±10 degrees.

In another aspect, a joint assembly with a press fitting and a tube inserted into the press fitting.

In yet another aspect, a press fitting, includes a socket defining at one end an opening for the insertion of an end of a tube, a sealing ring within the socket, and a gripping ring within the socket, arranged in front of the sealing ring in the direction of insertion of the tube, and comprising a plurality of teeth or projections on an upper surface thereof and a plurality of teeth or projections on a lower surface thereof, wherein the gripping ring is provided with an opening being reducible in size by deforming the gripping ring when applying a pressing action on the socket such that the inner diameter of the gripping ring is reduced.

In an additional aspect, a press fitting includes a socket defining at one end an opening for the insertion of an end of a tube, a sealing ring within the socket, and a gripping ring within the socket, arranged in front of the sealing ring in the direction of insertion of the tube, wherein the gripping ring is provided with an opening being reducible in size by deforming the gripping ring when applying a pressing action on the socket such that the inner diameter of the gripping ring is reduced, the inner diameter of the gripping ring is chosen to be larger than the outer diameter of the tube prior to reducing the size of the opening when applying a pressing action, and the gripping ring has an upper surface and a lower surface, and the upper surface has one or more gripping ring teeth or projections and the lower surface has one or more gripping ring teeth or projections.

The sealing ring may have at least one of a first portion or face facing towards the recess of the socket which is defined by a substantially rectangular cross section, a second portion or face facing towards the tube that is defined by a substantially triangular cross section or forming a projection, or a cross section that is symmetrical to a plane perpendicular to its axis or substantially triangular with smoothed edges.

The sealing ring may have at least one of an outside diameter that is chosen to be larger than the inside diameter of the recess, an inside diameter that is chosen to be larger than the tube outer diameter, or a width that is chosen to be larger than either the width of the cavity defined by the width of the recess of the socket minus the width of the gripping ring or the width of the separate recess of the socket.

DESCRIPTION OF THE SEVERAL VIEWS OF THE DRAWINGS

The present invention will now be described in relation to various preferred embodiments of which some aspects are illustrated by the accompanying figures, with other aspects being illustrated by the following examples as summarized in the following tables. In the figures:

Embodiments of the present disclosure will now be described by way of example, with reference to the accompanying drawings, in which:

FIG. 6a is a front elevation view of the gripping ring of FIG. 2;

FIG. 6b shows a projected section through A-A of FIG. 6a;

FIG. 10a is a front elevation view of the sealing ring shown in FIG. 1;

FIG. 10b shows a projected section through A-A of FIG. 10a;

FIGS. 19a, 19b, and 19c are diagrams illustrating the structure of another embodiment of a gripping ring of the present disclosure.

DETAILED DESCRIPTION

Figure 1:
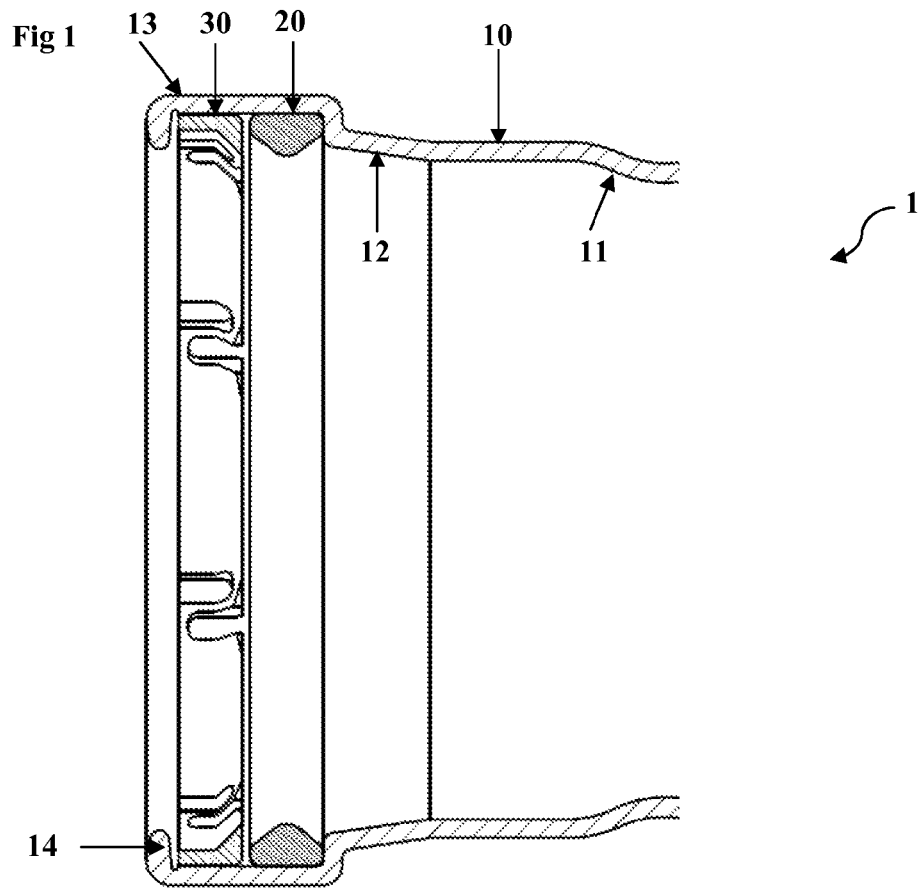
FIG. 1 is a longitudinal cross-sectional view of a press fitting of the present disclosure.

Before explaining at least one example of the invention in detail, it is to be understood that the invention is not limited in its application to the details of construction and to the arrangements of the components set forth in the following description or illustrated in the drawings. The Figures and written description are provided to teach any person skilled in the art to make and use the inventions for which patent protection is sought. The invention is capable of other embodiments and of being practiced and carried out in various ways. Those skilled in the art will appreciate that not all features of a commercial embodiment are shown for the sake of clarity and understanding. Persons of skill in the art will also appreciate that the development of an actual commercial embodiment incorporating aspects of the present inventions will require numerous implementation—specific decisions to achieve the developer's ultimate goal for the commercial embodiment. While these efforts may be complex and time-consuming, these efforts nevertheless would be a routine undertaking for those of skill in the art having the benefit of this disclosure.

In addition, it is to be understood that the phraseology and terminology employed herein are for the purpose of description and should not be regarded as limiting. For example, the use of a singular term, such as, "a" is not intended as limiting of the number of items. Also the use of relational terms, such as but not limited to, "top," "bottom," "left," "right," "upper," "lower," "down," "up," "side," are used in the description for clarity in specific reference to the Figures and are not intended to limit the scope of the invention or the appended claims. Further, it should be understood that any one of the features of the invention may be used separately or in combination with other features. Other systems, methods, features, and advantages of the invention will be or become apparent to one with skill in the art upon examination of the Figures and the detailed description. It is intended that all such additional systems, methods, features, and advantages be included within this description, be within the scope of the present invention, and be protected by the accompanying claims.

It will be appreciated by those skilled in the art that changes could be made to the embodiments described above without departing from the broad inventive concept thereof. It is understood, therefore, that the invention disclosed herein is not limited to the particular embodiments disclosed, but it is intended to cover modifications within the spirit and scope of the present invention as defined by the appended claims.

FIG. 1 illustrates a cross section through a press fitting 1 of the present disclosure prior to the application of a pressing action. The press fitting 1 comprises a socket 10 designed to accept a tube (not shown) and, after a diametric reduction by a pressing tool (not shown), to provide a gas/water tight joint with said tube having a sealing ring 20 as well as a gripping ring 30 arranged between the socket 10 and the tube.

The socket 10, preferably being a metal socket 10 of known structure, may be incorporated into fittings as to provide directional variation, diameter reduction of tube, or jointing to threaded connections. It is provided with a step 11 for stopping the introduction of the tube, a taper 12 to facilitate the introduction of the tube, which will be at least partly diminished when applying a pressing action for closing the joint assembly, and a recess 13 for housing, in the direction of the tube insertion, at first the gripping ring 30 and behind the gripping ring 30 the sealing ring 20, with a flange 14 of the socket 10 at the open mouth thereof securing the gripping ring 30 as well as the sealing ring 20 within the recess 13.

No spacer as utilized in known technology is required. An explanation of the technical reasoning behind the omission of a spacer is described later. The use of two parts only between the socket 10 and the tube of a fitting of this type is novel.

Figure 2:
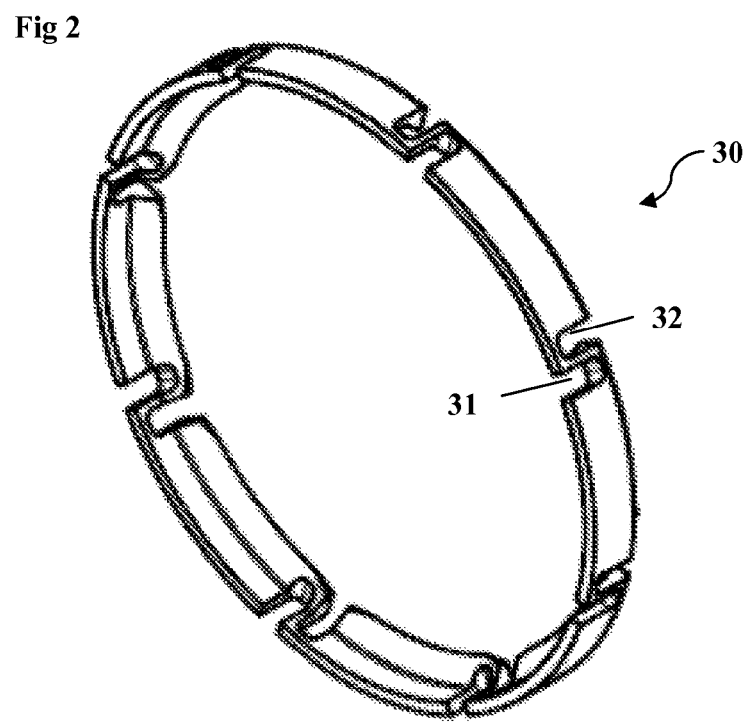
FIG. 2 is a perspective view of the gripping ring shown in FIG. 1.

The gripping ring 30 is more clearly illustrated in FIG. 2. A plurality of deliberately weakened sections, provided in the form of notches 31, 32, preferentially equally spaced, extend around the diameter of the gripping ring 30 and are provided to reduce the force needed during the pressing action to reduce the diameter of the joint assembly. During pressing, the gripping ring 30 the notches 31, 32 are deformed allowing diameter reduction. This diameter reduction induces engagement of the inner edge of the gripping ring 30 and the inserted tube. The design maintains even distribution of the engagement between the tube and the gripping edge around its diameter.

The illustrated version of FIG. 2 shows a specific form of weakening sections. There could be other variations that are effective to varying degrees. The use of such forms to provide an effective diameter reduction without the use of forces beyond the capabilities of a readily available pressing tool is principal to the present disclosure.

Figure 3A:
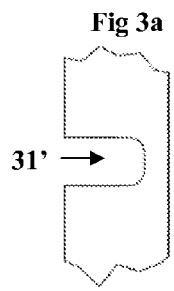
FIGS. 3a, 4a, and 5a show front elevation views of different weakening features of a gripping ring to be used in a press fitting of the present disclosure.
Figure 3B:
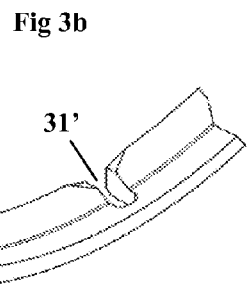
FIGS. 3b, 4b, and 5b show isometric details of the weakening features of FIGS. 3a, 4a, and 5a, respectively.
Figure 4A:
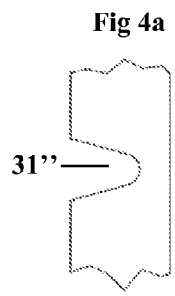
Figure 4B:
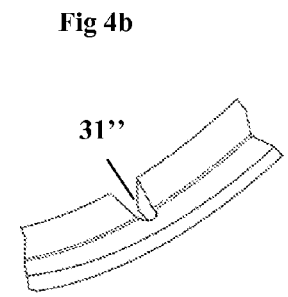
Figure 5A:
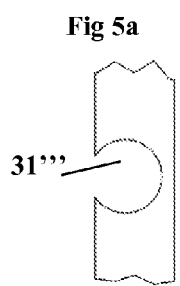
Figure 5B:
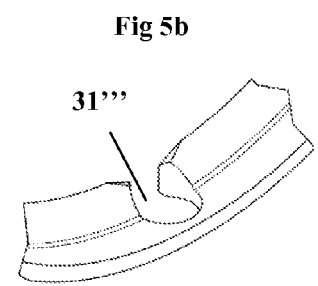

Variations of the notches 31 to 31''' are illustrated in FIGS. 3a, 4a, 5a and their related isometric details in FIGS. 3b, 4b, and 5b. In these instances, the notches of no particularly specified shape are used to create weak points in the gripping ring 30. In instances of FIGS. 3a, 4a, and 5a the notches 31', 31'', and 31''' are shown on one edge of the gripping ring 30. It is also possible that notches are provided by opposed pairs or arranged as shown in FIG. 2.

The material of the gripping ring 30 chosen for its hardness qualities and corrosion resistance is stainless steel although other materials with suitable hardness and corrosion resistance, either inherent or added via coatings, may be usable. The hardness of the material is critical to provide sufficient penetration of the gripping edge into the inserted tube and also provide resistance to deformation of the edge when tensile forces are applied due to pressurization of the completed joint. It is also conceivable that such a configuration could be split at a chosen point around the diameter of the gripping ring 30 and still function effectively.

The gripping mechanism is now explained in further detail with reference to FIGS. 6a to 8b.

Figures 6A, 6B:
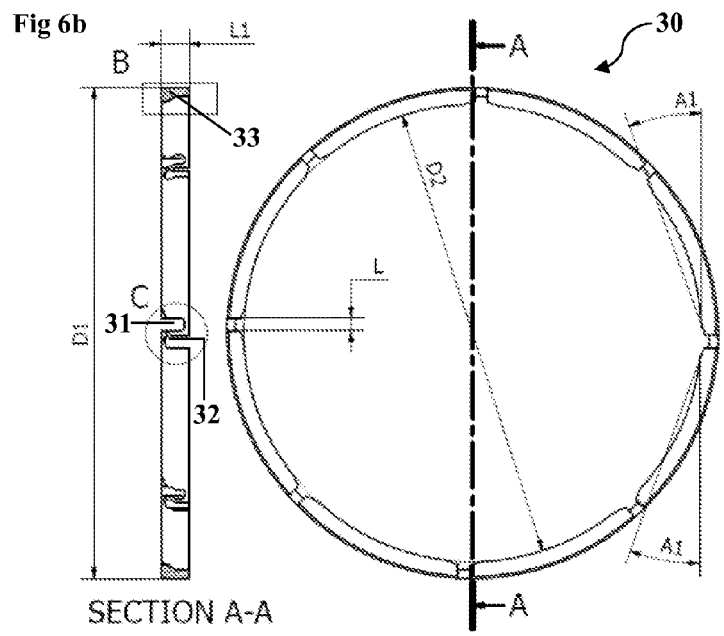

FIG. 6a is a front elevation view of the gripping ring 30 of FIG. 2, and FIG. 6b illustrates a projected section through A-A of FIG. 6a. The gripping ring 30 is designed as follows:

D1 and D2 are the outer and inner diameters of the gripping ring 30, respectively. D1 is chosen to fit within the socket recess 13, whereas D2 is chosen to be bigger than the outer diameter of an incoming tube to ensure a tight joint as explained later. L1 is the length of the gripping ring 30 in the tube insertion direction and is chosen to be of sufficient length to prevent section rotation when tensile forces are applied to the joint assembly.

A1 are chamfer angles provided to reduce circumferential engagement with the tube during pressing and thus reduce forces required. The chamfer angle can be around 20° and should not exceed 45°.

Rectangle B in FIG. 6b highlights a section through the main part of the gripping ring 30 and shows a gripping edge or rather tooth 33 facing the tube in a joint assembly. The tooth 33 is shown enlarged in FIG. 7 with its gripping angle A2. The gripping angle A2 has proven to be advantageous to be greater than 45°. At 45° or less, the interior gripping edge can be distorted to cause joint failure when tensile forces induced by pre-determined test pressures are applied. It is of course possible to use smaller angles A2 if harder materials were used but would imply greater costs. Also, where lesser tensile forces are encountered, the necessity for a greater degree of inclusive angle A2 is reduced.

Figure 7:
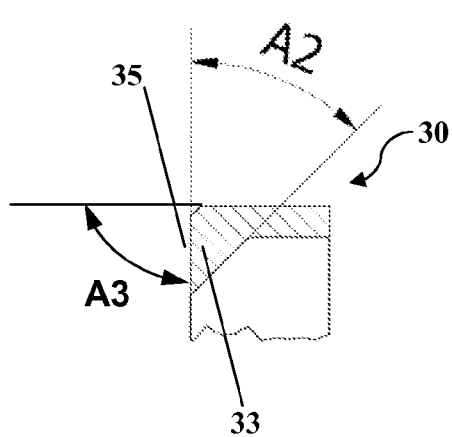
FIG. 7 is an enlarged view of FIG. 6b in the region of rectangle B.

The gripping ring is provided with a face 35 best shown in FIG. 7 next to the sealing ring 20. This face 35 together with the recess 13 defines a cavity for holding the sealing ring 20 in position. In order to avoid a migration of sealing ring material outside that cavity, in particular within the region of the gripping ring 30, the face 35 extends substantially radially, being in the vertical direction in the FIGURES. Thus, the face 35 forms an abutment face with an angle A3 to the recess 13 of around 90°.

Figure 8A:
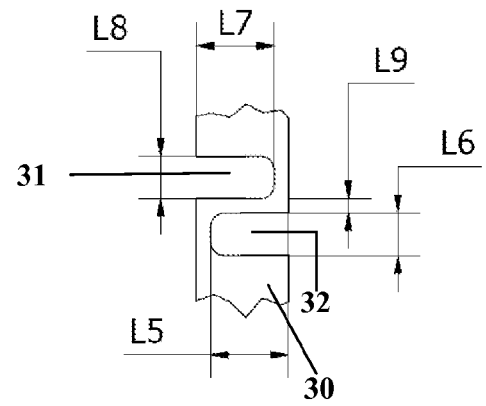
FIG. 8a is showing two opposing notches of the gripping ring of FIG. 2 prior to the application of pressure.
Figure 8B:
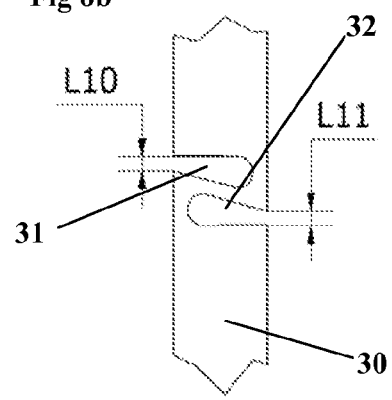
FIG. 8b is showing the two notches of FIG. 8a after the application of pressure when forming a tight joint assembly of the present disclosure.

Circle C in FIG. 6b highlights a weakening section in the form of two opposing notches 31 and 32. L is the gap between neighboring teeth 33 on the gripping or seal side of the gripping ring 30. The lengths L5 to L9 defining the opposing notches 31 and 32 of the gripping ring 30 and shown in FIG. 8a encourage collapse of the gripping ring diameter. The one notch 31 has a radial length L7 and an axial length L8 and the other notch 31 has a radial length L5 and an axial length L6, with the two notches being separated by a length L9 in an axial direction. During a pressing operation, the forces implied on the joint assembly cause the notches 31 and 32 to collapse to adopt a form as shown in FIG. 8b with axial length L10 and L11 being smaller than L8 and L6, respectively. The reduction of the length L6 (L8) to a lesser value L11 (L10) is also beneficial for preventing any possible high pressure extrusion of the sealing means through any of the gaps L.

The radial alignment of the inner gripping edges of the teeth 33 and the outer edges of the gripping ring 30 facing the socket 10 is maintained during the distortion. This is beneficial to both the seal and the engagement of the tube. The space in which the seal needs to operate is not violated and the maintenance of the radial alignment of the teeth 33 provides a consistent force to retain the tube under pressure-induced tension.

Next, the special design of the sealing ring 20 of the present disclosure is described with reference to FIGS. 9 to 11.

The use of an O ring is known in press fittings. But the socket shape with a substantially rectangular recess 13 is not ideally suited to such an O ring. Although the radial inner length L12 of the recess 13 shown in FIG. 9 is chosen to provide desired compression of the sealing ring, it is not sufficient to prevent potential for an O ring displacement during tube insertion if an O ring of a diameter equivalent to (or greater than) L14 is used, with L14 being greater than L12. This has led in the past to development and inclusion of particular spacer parts to prevent O ring displacement.

For seals to function correctly, the cross-sectional area of the recess 13 must provide at least an equivalent area of the sealing ring 20, and it has to be taken into consideration that the gripping ring 30 has some limited linear movement in the unpressed joint condition and therefore could move to a position where, if an O ring was utilized, the necessary cross-sectional area is encroached upon. Previous designs have answered this problem with special spacers.

Figure 9:
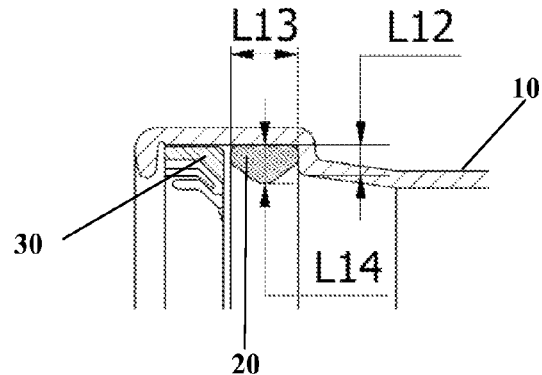
FIG. 9 is a part view of FIG. 1.

The arrangement of FIG. 9 dispenses with the need for such spacers. Localized distortion in the form of tube diameter reduction may occur in the immediate vicinity of the gripping edges. In the instance of an 0 ring being used, the 0 ring could migrate, either before pressing or via pressure-induced movement after pressing, to the reduced tube area adjacent to the gripping edges. This could result in joint failure via leakage of the interior medium. With the seal shape of the present disclosure, this is avoided.

Figures 10A, 10B:
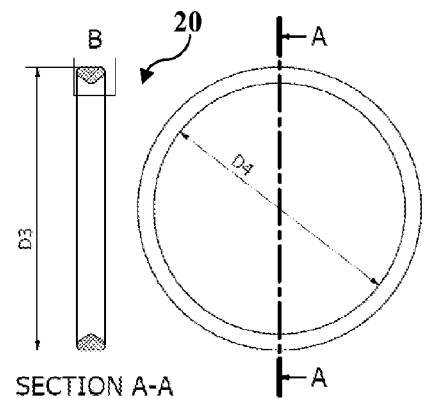
Figure 11:
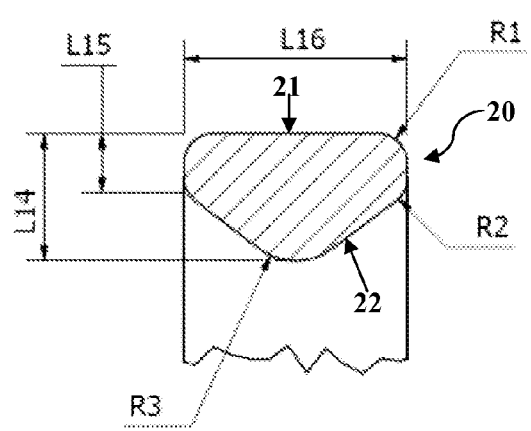
FIG. 11 is a cross-sectional view of the sealing ring of FIGS. 10a and 10b.

The shape of the sealing ring 20 utilized according to the present disclosure and shown best in FIGS. 10 and 11 is self regulating to provide sufficient area for seal function after pressing and is designed as follows:

The sealing ring 20 has an outside diameter D3 that is chosen to be, in all instances of tolerance, larger than the inside diameter of the recess 13. This ensures the provision of an outwardly radial force that encourages the sealing ring 20 to remain in its location. The inside diameter D4 of the sealing ring 20 depends on D3 and L14 but in all instances is smaller than the tube outer diameter.

The sealing ring 20 has two different portions or faces, a first face 21 facing towards the recess 13 and a second face 22 facing towards the tube. The first face 21 is defined by a substantially rectangular cross section with smoothened edges (see lengths L15 and L16 as well as radii R1 and R2 in FIG. 11) to fit within the recess 13. The second face 22 is chosen to assist in the prevention of seal displacement and has a substantially triangular cross section with smoothened edges (see radii R2 and R3 in FIG. 11) forming a projection with a length L14-L15. If a tube upon insertion is inserted at an angle to the main axis of the socket 10, the effect of tube edge contact with face 22 is to urge the sealing ring 20 radially outwards thus preventing seal displacement. In this instance, the sealing ring 20 is symmetrical to prevent accidental incorrect assembly, losing this facility.

Length L13 in FIG. 9 or L16 in FIG. 11 defines the width of the sealing ring 20 or rather of its first face 21 and is chosen to provide sufficient distance between the teeth 33 or rather its gripping edges of the gripping ring 30 and the sealing ring 20 or rather its central radius R3 within the recess 13.

Furthermore, the shape of the seal described above provides greater seal-to-tube and seal-to-socket contact areas than would be the case in the instance of an 0 ring being used. This provides a more secure sealing means. In parallel operating conditions, the seal would provide greater longevity due to the greater sealing area employed. Particularly, in larger size fittings where the cost of replacement is considerably higher than that of smaller diameter fittings, this is a considerable advantage.

Figure 12:
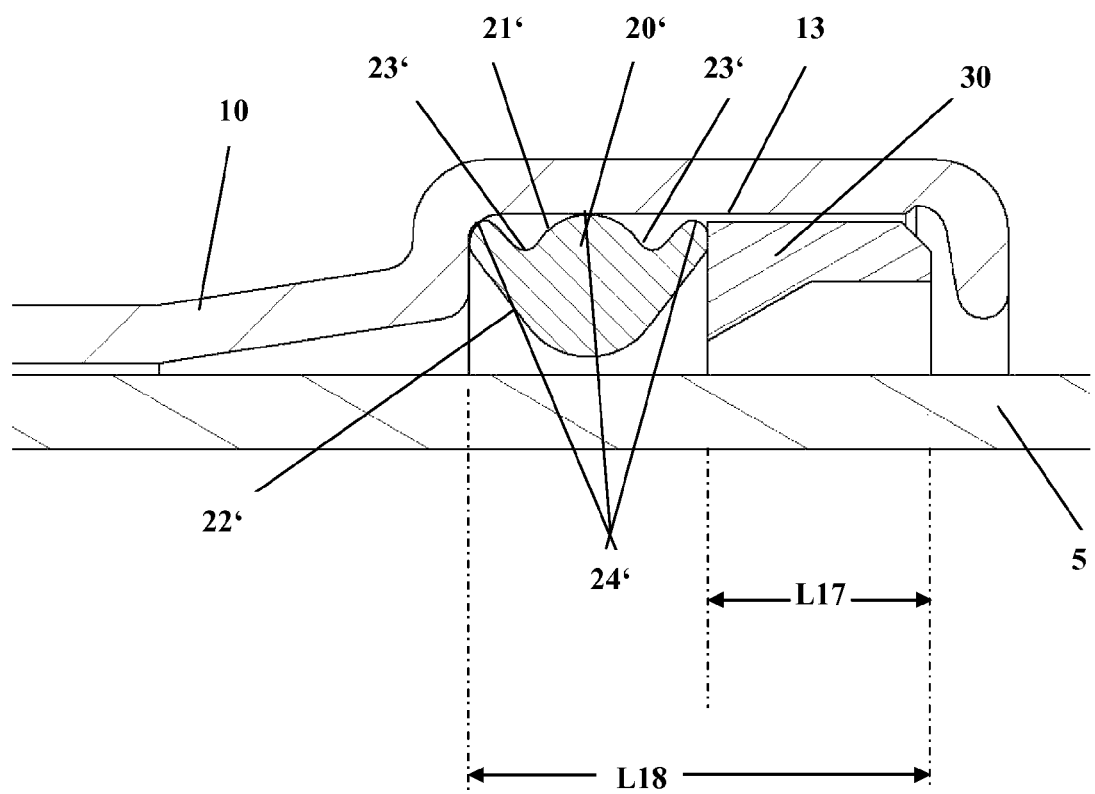
FIGS. 12, 13, 14, 15, and 16 are part cross sections of different joint arrangements of the present disclosure.

FIGS. 12 to 16 illustrate a joint assembly of the present disclosure with a tube 5 inserted. FIG. 12 depicts a joint assembly with the socket 10 housing a special sealing ring 20' as well as the gripping ring 30 within its recess 13 for engagement with the tube 5. The sealing ring 20' has a substantially triangular cross section with smoothed edges and two recesses 23' between three projections 24' on its first face 21' facing towards the recess 13 of the socket 10. Choosing the outside diameter D3 of the sealing ring 20' to be larger than the inside diameter of the recess 13 of the socket 10, the inside diameter D4 of the sealing ring 20' to be smaller than the outer diameter of the tube 5, and the width L16 of the sealing ring 20' to be larger than the difference between the width L18 of the recess 13 and the width L17 of the gripping ring 30 will lead to the material of the sealing ring 20' substantially closing the cavity provided for the sealing ring 20' when applying a pressing action to the assembly for securing the same. In fact, the sealing ring 20' is able to better fill the cavity defined by the socket 10 with its recess 13, the gripping ring 30, and the tube 5 optimizing its sealing function with the design depicted in FIG. 12.

Figure 13:
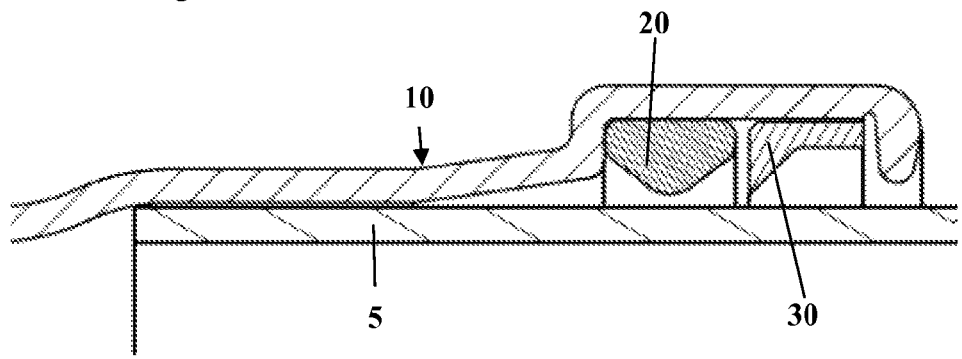
Figure 14:
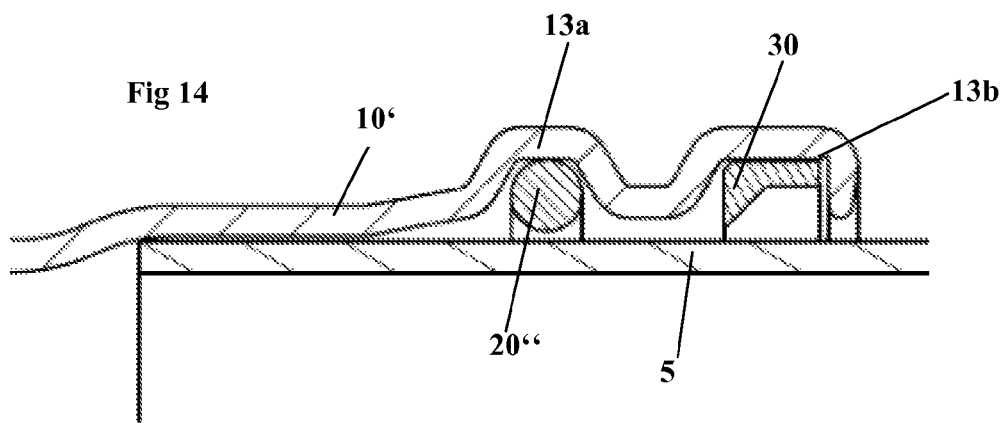
Figure 15:
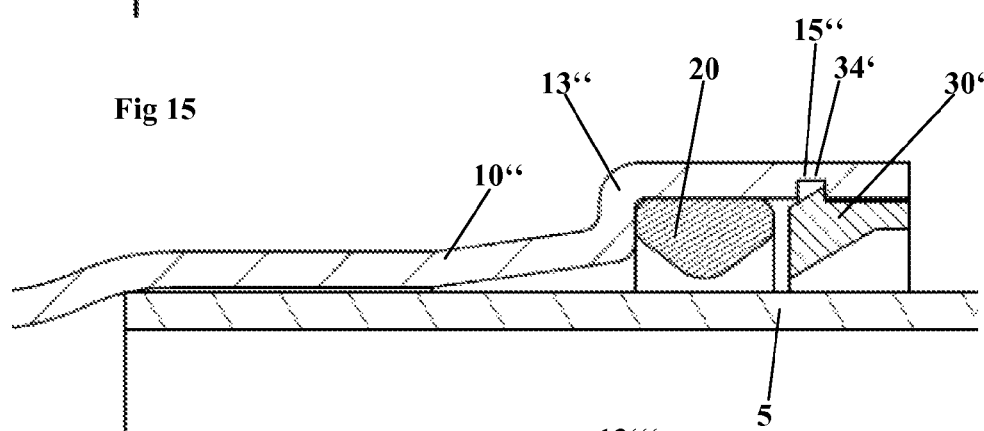
Figure 16:
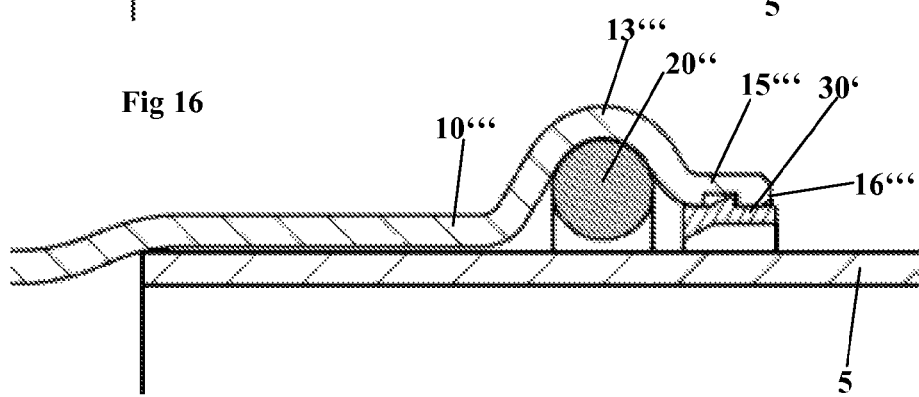

FIG. 13 shows the usage of the press fitting of FIG. 1 together with the tube 5 to provide a joint arrangement. FIG. 14 illustrates the usage of the gripping ring 30 having the design shown in FIG. 2 in a different socket configuration having two recesses 13a and 13b, one recess 13a provided for a sealing ring 20", and the other recess 13b provided for the gripping ring 30, and making usage of a common O ring 20'. FIG. 15 illustrates the usage of a gripping ring 30' differing from the one of FIG. 2 by the addition of an outwardly raised portion or projection 34' to engage in an internal circumferential groove 15" of the socket 10" to provide a secure engagement and positioning. The inherent spring function of the gripping ring 30', caused by its weakening features, will be urged into the desired position during assembly, such that the socket 10" does not need a flange to hold the gripping ring 30' at the desired position. FIG. 16 illustrates the use of a similar gripping ring 30' as in FIG. 14 within a different press socket profile having a recess 13''' for an O ring 20''' and opened mouth 16''' without a flange, but with a recess 15''' for engaging the gripping ring 30'.

Figure 17A:
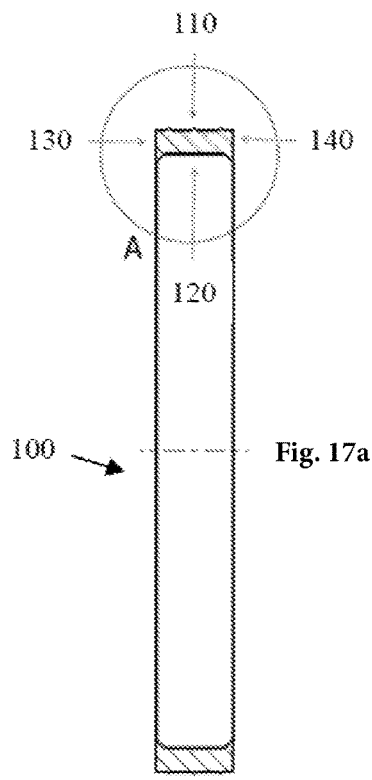
FIGS. 17a, 17b, and 17c are diagrams illustrating the structure of another embodiment of a gripping ring of the present disclosure.
Figure 17C:
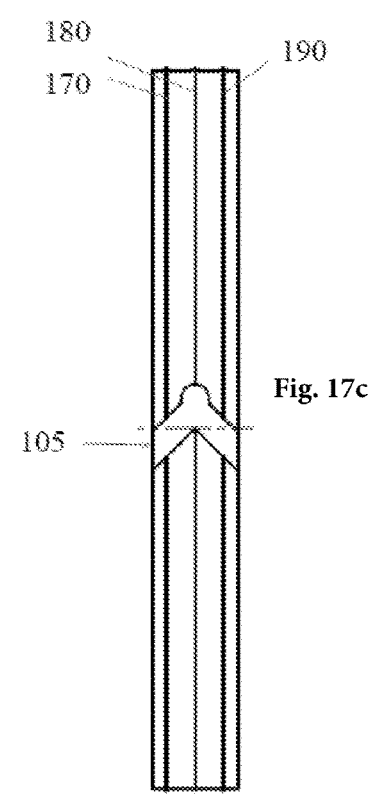
Figure 17B:
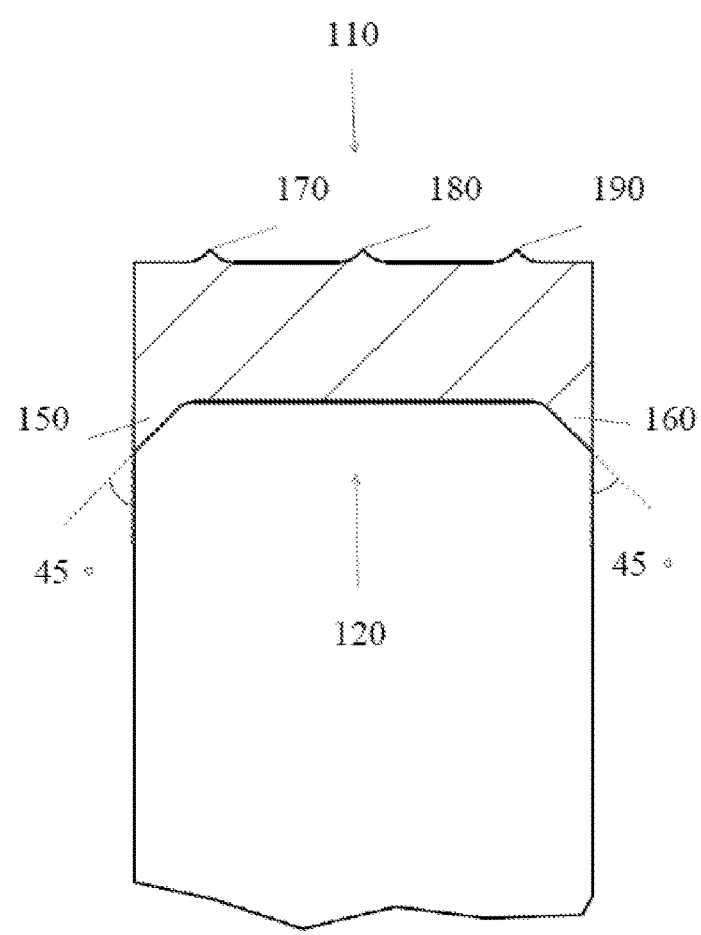

FIGS. 17a, 17b, and 17c are diagrams illustrating the design of a gripping ring 100. FIG. 17a is a cross-sectional view of the gripping ring 100 showing an upper surface 110, a lower surface 120, an outer side surface 130, and an inner side surface 140. The inner side surface 140 is the surface that is facing the sealing ring.

Referring to FIG. 17b, a magnified view of portion A of FIG. 17a is illustrated. The lower surface 120 of the gripping ring 100 has two internal teeth or projections 150, 160 for biting into the tube. The first internal projection 150 is formed at the outer side surface 130 and the second internal projection 160 is formed at the inner side surface 140, and each of the internal projections 150, 160 forms a right-angle triangle cross-section at both sides of the gripping ring 100. The upper surface 110 includes three external teeth or projections 170, 180, 190 that bite into the copper body of the pipe fitting to prevent movement under tensile loading caused by system pressure. Still referring to FIG. 17b, the two internal projections 150, 160 form a 45 degree angle with the vertical axis that is parallel to each of the outer side surface 130 and the inner side surface 140.

Referring to FIG. 17c, an elevation view of the gripping ring 100 is illustrated. As mentioned above, the gripping ring 100 has an opening 105 so that the ring is not fully closed but C-shaped. The opening 105 of this example has a v-shape with a curved vertex.

Figure 17D:
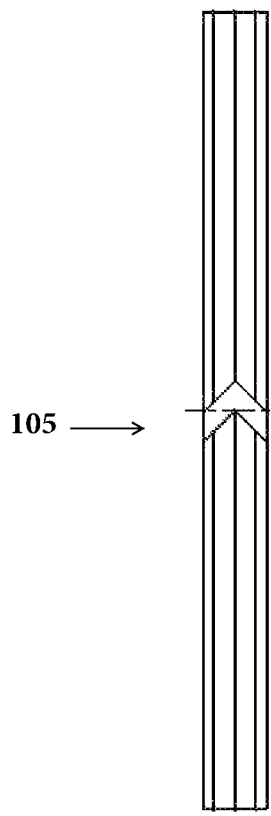
FIGS. 17d and 17e are diagrams illustrating another embodiment of the opening for the gripping ring illustrated in FIGS. 17a-17c.
Figure 17E:
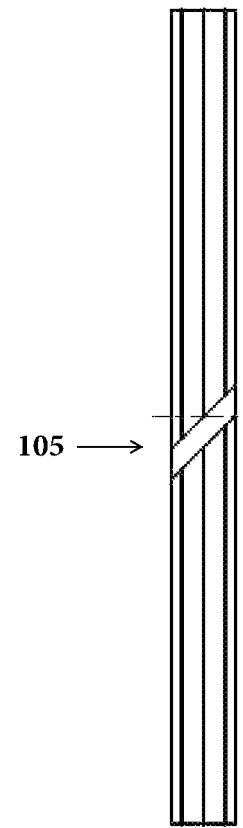

FIGS. 17d and 17e are diagrams illustrating another embodiment of the opening 105 for the gripping ring 100 illustrated in FIGS. 17a-17c. Referring to FIG. 17d, an elevation view of the gripping ring 100 is illustrated. The opening 105 of this example has a v-shape with a triangular vertex. Referring to FIG. 17e, an elevation view of the gripping ring 100 is illustrated. The opening 105 of this example has an opening that extends in a straight line and cuts at an angle with respect to the sides of the gripping ring 100.

Figure 18A:
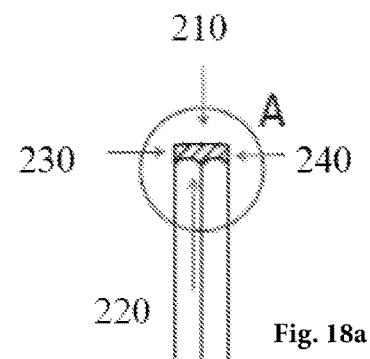
FIGS. 18a, 18b, and 18c are diagrams illustrating the structure of another embodiment of a gripping ring of the present disclosure.
Figure 18C:
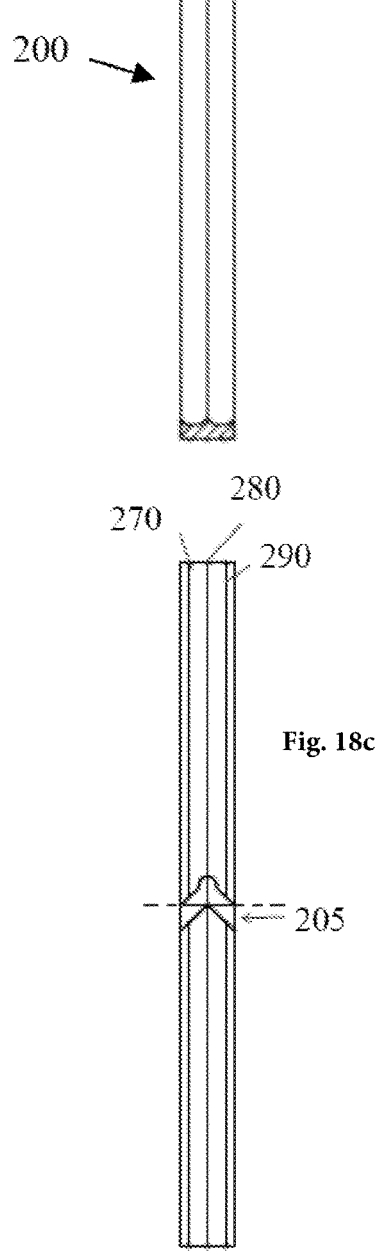
Figure 18B:
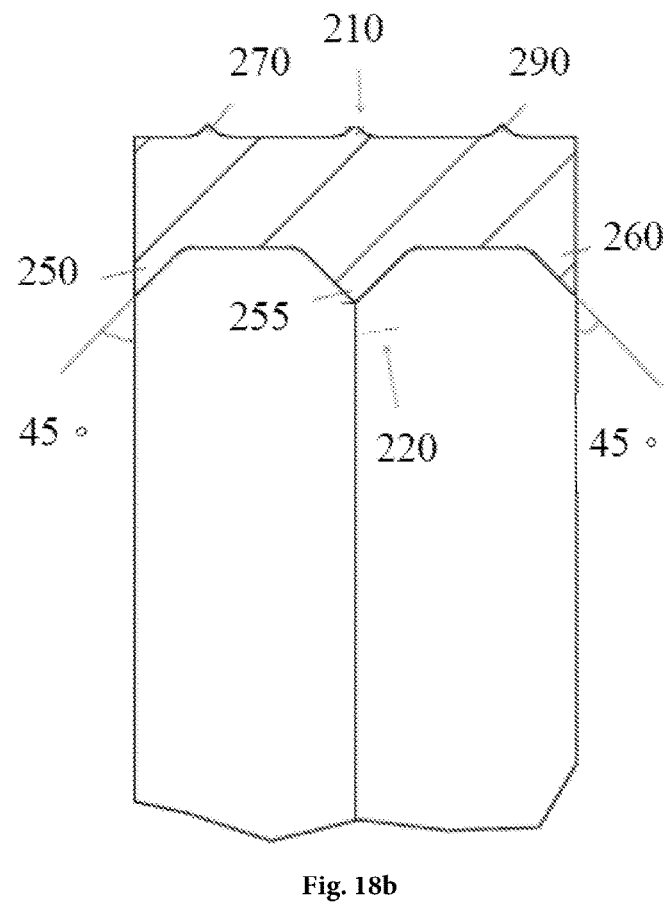

FIGS. 18*a*, 18*b*, and 18*c* are diagrams illustrating the design of the gripping ring 200. FIG. 18*a* is a cross-sectional view of the gripping ring 200 showing an upper surface 210, a lower surface 220, an outer side surface 230, and an inner side surface 240. The inner side surface 240 is the surface that is facing the sealing ring.

Referring to FIG. 18*b*, a magnified view of portion A of FIG. 18*b* is illustrated. The lower surface 220 of the gripping ring 200 has three internal teeth or projections 250, 255, 260 for biting into the tube. The first internal projection 250 is formed at the outer side surface 230 and the second internal projection 260 is formed at the inner side surface 240, and each of the internal projections 250, 260 forms a right-angle triangle cross-section at both sides of the gripping ring 200. In addition, a third internal projection 255 extends from the middle of the lower surface 220. The upper surface 210 includes three external teeth or projections 270, 280, 290 that bite into the copper body of the pipe fitting to prevent movement under tensile loading caused by system pressure. Still referring to FIG. 18*b*, the two internal projections 250, 260 form a 45 degree angle with the vertical axis that is parallel to each of the outer side surface 230 and the inner side surface 240.

Referring to FIG. 18*c*, an elevation view of the gripping ring 200 is illustrated. As mentioned above, the gripping ring 200 has an opening 205 so that the ring is not fully closed but C-shaped. The opening 205 of this example has a v-shape with a curved vertex.

Figure 18D:
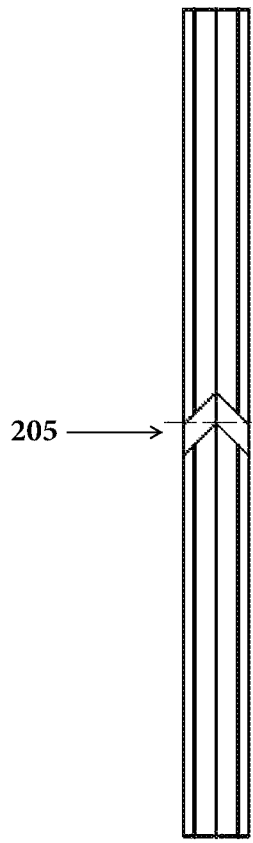
FIGS. 18d and 18e are diagrams illustrating another embodiment of the opening for the gripping ring illustrated in FIGS. 18a-18c.
Figure 18E:
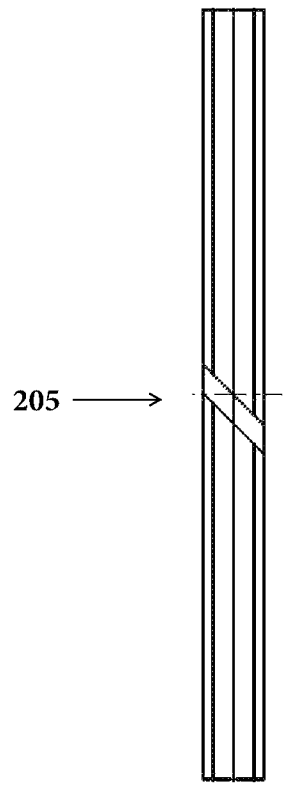

FIGS. 18*d* and 18*e* are diagrams illustrating another embodiment of the opening 205 for the gripping ring 200 illustrated in FIGS. 18*a*-18*c*. Referring to FIG. 18*d*, an elevation view of the gripping ring 200 is illustrated. The opening 205 of this example has a v-shape with a triangular vertex. Referring to FIG. 18*e*, an elevation view of the gripping ring 200 is illustrated. The opening 205 of this example has an opening that extends in a straight line and cuts at an angle with respect to the sides of the gripping ring 200.

FIGS. 19*a*, 19*b*, and 19*c* are diagrams illustrating the design of the gripping ring 300. FIG. 19*a* is a cross-sectional view of the gripping ring 300 showing an upper surface 310, a lower surface 320, an outer side surface 330, and an inner side surface 340. The inner side surface 340 is the surface that is facing the sealing ring.

Referring to FIG. 19*b*, a magnified view of portion A of FIG. 19*a* is illustrated. The lower surface 320 of the gripping ring 300 has four internal teeth or projections 350, 355, 360, 365 for biting into the tube. The first internal projection 350 is formed at the outer side surface 330 and the second internal projection 360 is formed at the inner side surface 340, and each of the internal projections 350, 360 forms a right-angle triangle cross-section at both sides of the gripping ring 300. In addition, a third internal projection 355 and a fourth internal projection 365 extend from the middle of the lower surface 320 and form right-angle triangle cross-sections. The upper surface 310 includes three external teeth or projections 370, 380, 390 that bite into the copper body of the pipe fitting to prevent movement under tensile loading caused by system pressure. Still referring to FIG. 19*b*, the two internal projections form a 45 degree angle with the vertical axis that is parallel to each of the outer side surface 330 and the inner side surface 340.

Referring to FIG. 19*c*, an elevation view of the gripping ring 300 is illustrated. As mentioned above, the gripping ring 300 has an opening 305 so that the ring is not fully closed but C-shaped. The opening 305 of this example has a v-shape with a curved vertex.

Figure 19D:
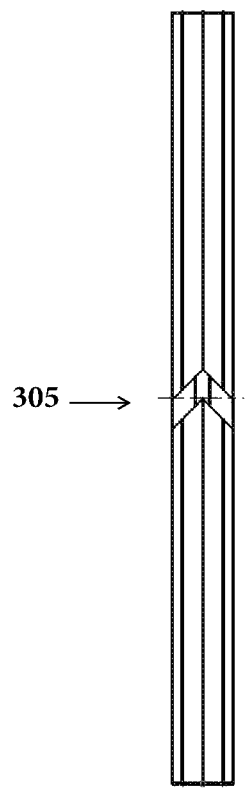
FIGS. 19d and 19e are diagrams illustrating another embodiment of the opening for the gripping ring illustrated in FIGS. 19a-19c.
Figure 19E:
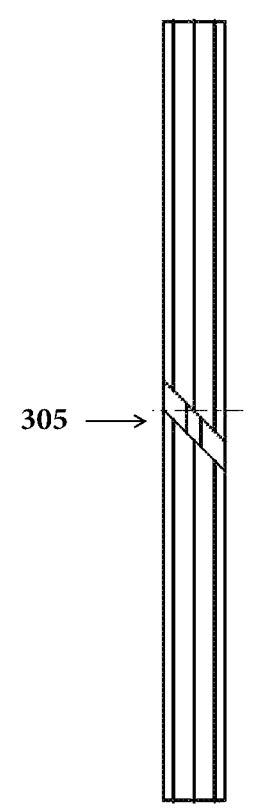

FIGS. 19*d* and 19*e* are diagrams illustrating another embodiment of the opening 305 for the gripping ring 300 illustrated in FIGS. 19*a*-19*c*. Referring to FIG. 19*d*, an elevation view of the gripping ring 300 is illustrated. The opening 305 of this example has a v-shape with a triangular vertex. Referring to FIG. 19*e*, an elevation view of the gripping ring 300 is illustrated. The opening 305 of this example has an opening that extends in a straight line and cuts at an angle with respect to the sides of the gripping ring 300.

In all examples described above in FIGS. 17*a*-19*e*, the teeth or projections of the gripping rings 100, 200, 300 may form a 45 degree or a 90 degree angle. The teeth or projections may be evenly separated; for example, the upper teeth may be 1.5 mm from the edge and 3 mm apart from one another. For gripping ring 100, the lower teeth may be on the edge and 9 mm apart. For gripping ring 200, two lower teeth may be on the edge and 9 mm apart and separated by a central lower tooth. For gripping ring 300, two lower teeth may be on the edge and 9 mm apart, and two lower teeth may 3.5 mm apart from the teeth from on the edge and 2 mm apart from one another. Also, the angle formed by the v-shaped openings in the examples described above may be 45 degrees from the horizontal and the opening may be 3 mm thick.

The features disclosed in the claims, the specification, and the figures may be important for the claimed invention, taken separately or in any combination, for the invention in the respective different embodiments.

The invention claimed is:

1. A press fitting, comprising:
   a socket defining at one end an opening for the insertion of an end of a tube;
   a sealing ring within the socket; and
   a gripping ring within the socket, arranged in front of the sealing ring in the direction of insertion of the tube,
   wherein the gripping ring is provided with an opening being reducible in size by deforming the gripping ring when applying a pressing action on the socket such that the inner diameter of the gripping ring is reduced,
   the inner diameter of the gripping ring is chosen to be larger than the outer diameter of the tube prior to reducing the size of the opening when applying a pressing action, and the opening has a curved vertex,
   the gripping ring has two ends surfaces which are perpendicularly to the longitudinal axis of the gripping ring as well as a radially outward facing upper surface and a radially inward facing lower surface,
   the opening is extending from the one end surface to the other end surface of the gripping ring and has a v shape and curved vertex, and
   the upper surface has three gripping ring teeth or projections and the lower surface has two gripping ring teeth or projections, the three upper teeth or projections being formed at a center of the gripping ring, and the two lower teeth or projections being formed at an edge of the gripping ring.

2. The press fitting according to claim 1, wherein the opening extends substantially axially.

3. The press fitting of claim 1, wherein the gripping ring has one or more teeth or projections and the teeth or projections of the gripping ring form a 45 degree or a 90 degree angle.

4. The press fitting of claim 1, wherein the gripping ring has one or more teeth or projections and the teeth or projections are evenly separated.

5. The press fitting of claim 1, wherein the v-shaped opening forms an angle that is substantially 45 degrees with respect to a horizontal axis perpendicular to the longitudinal axis of the gripping ring.

6. The press fitting according to claim 1, wherein the gripping ring is arranged within a recess of the socket together with the sealing ring or within a recess of the socket separate from the recess of the socket for the sealing ring or within a broadened mouth of the socket separate from the recess of the sealing ring.

7. The press fitting according to claim 1, wherein the gripping ring and the sealing ring are arranged next to each other within the same recess, having a substantially rectangular cross section, with the face of the gripping ring facing towards the sealing ring forming a sealing ring abutment with an abutment angle relative to the inner surface of the socket within the recess of 90 degrees±10 degrees.

8. A joint assembly with a press fitting according to claim 1 and a tube inserted into the press fitting.

9. A press fitting, comprising:
   a socket defining at one end an opening for the insertion of an end of a tube;
   a sealing ring within the socket; and
   a gripping ring within the socket, arranged in front of the sealing ring in the direction of insertion of the tube,
   wherein the gripping ring is provided with an opening being reducible in size by deforming the gripping ring when applying a pressing action on the socket such that the inner diameter of the gripping ring is reduced, and
   the inner diameter of the gripping ring is chosen to be larger than the outer diameter of the tube prior to reducing the size of the opening when applying a pressing action, and the opening has a curved vertex,
   the gripping ring has two end surfaces which are extending perpendicularly to the longitudinal axis of the gripping ring as well as a radially outward facing upper surface and a radially inward facing lower surface,
   the opening is extending from the one end surface to the other end surface of the gripping ring and has a v shape and a triangular vertex, and
   the upper surface has three gripping ring teeth or projections and the lower surface has two gripping ring teeth or projections, the three upper teeth or projections being formed at a center of the gripping ring, and the two lower teeth or projections being formed at an edge of the gripping ring.

* * * * *